United States Patent [19]

Wang et al.

[11] Patent Number: 5,052,000

[45] Date of Patent: Sep. 24, 1991

[54] TECHNIQUE FOR IMPROVING THE OPERATION OF DECISION FEEDBACK EQUALIZERS IN COMMUNICATIONS SYSTEMS UTILIZING ERROR CORRECTION

[75] Inventors: Jin-Der Wang, Eatontown; Jean-Jacques Werner, Holmdel, both of N.J.

[73] Assignee: AT&T Bell Laboratories, Murray Hill, N.J.

[21] Appl. No.: 363,793

[22] Filed: Jun. 9, 1989

[51] Int. Cl.$^5$ ............................................. G06F 11/10
[52] U.S. Cl. ......................................... 371/43; 375/14
[58] Field of Search ............... 371/43, 44, 45; 375/11, 375/12, 15, 14, 34

[56] References Cited

U.S. PATENT DOCUMENTS

| | | | |
|---|---|---|---|
| 3,988,677 | 10/1976 | Fletcher et al. | 371/45 |
| 4,631,735 | 12/1986 | Qureshi | 371/43 |
| 4,677,625 | 6/1987 | Betts et al. | 371/43 |
| 4,833,693 | 5/1989 | Eyuboglu | 375/34 |
| 4,881,241 | 11/1989 | Pommier et al. | 375/38 |
| 4,907,233 | 3/1990 | Deutsch et al. | 371/43 |

*Primary Examiner*—Charles E. Atkinson
*Attorney, Agent, or Firm*—David R. Padnes

[57] ABSTRACT

The combined benefits of decision feedback equalization and error correction coding are realized in a communications system by the use of a plurality of coders and decoders respectively disposed in the transmitter and receiver. The plurality of encoders and decoders is used to interleave the data symbols so that each coder and decoder is operative upon every Mth symbol, where M is the number of coders or decoders. By a judicious choice of M, both the probability of noise impairing the recovery of successive symbols and the error propagation effects inherent in decision feedback equalizers are reduced.

14 Claims, 3 Drawing Sheets

32-POINT SIGNAL CONSTELLATION WITH TRELLIS CODING

16-POINT SIGNAL CONSTELLATION WITH NO CODING

TECHNIQUE FOR IMPROVING THE OPERATION OF DECISION FEEDBACK EQUALIZERS IN COMMUNICATIONS SYSTEMS UTILIZING ERROR CORRECTION

TECHNICAL FIELD

The present invention relates to communications systems and, more particularly, to the combined use of decision feedback equalizers and error correction coding in such systems.

BACKGROUND OF THE INVENTION

Equalizers are widely used apparatus in communications systems to compensate for linear (amplitude and phase) distortion in the channel. Linear equalizers and decision feedback equalizers are two major equalizer classifications. Linear equalizers are more widely used than the decision feedback equalizers in many communications applications as they are simpler to implement and provide virtually the same compensation benefits. However, with the development of higher transmission speeds, i.e., above 19.2 kb/s for voiceband modems, a decision feedback equalizer provides a significant advantage over a linear equalizer and is definitely the preferred compensation apparatus because it is better suited to compensate for the severe amplitude distortion that is experienced by the higher speed modems. The problem with the implementation of decision feedback equalization is that it does not operate harmoniously in systems using error correction coding as will now be explained.

Error correction coding is a coding technique used to increase the immunity of a digital information signal to the presence of noise. Such increased immunity, in turn, increases the probability of accurately recovering the information signal in the receiver unit of a data communications system. Error correction is typically characterized as being either block or convolutional coding. Trellis coding is one well-known error correction coding technique that utilizes convolutional coding and does not affect the bandwidth required of the communications system.

In block coding, one or more error correction bits are transmitted along with a "block" of one or more information bits. Each of these error correction bits has a value which is determined by the value of the information bit or bits in the associated block. This process of transmitting an expanded number of bits for error correction is also utilized in convolutional coding but, unlike block coding, the value of each bit in convolutional coding is a function of the information bits in the associated block and a number of priorly transmitted blocks.

Coding gain is a term which refers to the increased performance of a system resulting from the use of error correction. It is defined as the amount by which the signal-to-noise ratio may deteriorate before the bit error rate equals that of the same system without error correction. This term can be calculated analytically for any system and, for purposes herein, the resulting quantity is referred to as the theoretical coding gain.

As decision feedback equalization and error correction coding each address different undeirable effects in digital communications systems, namely amplitude distortion and noise, respectively, the combination of both techniques should provide a greater benefit than either technique alone. It has been found, however, that when decision feedback equalizers are operative upon digital signals incorporating error correction, system performance is degraded. Indeed, the resulting performance can be substantially below that obtainable with the use of either error correction or decision feedback equalization alone. Accordingly, a significant communications improvement would result if the combined benefits of both decision feedback coding and error correction coding could be obtained in a single communications system.

SUMMARY OF THE INVENTION

The present invention permits the combined benefits of decision feedback equalization and error correction coding to be realized in a communications system. Pursuant to the present invention, a decision feedback equalizer is used with a plurality of encoders and decoders respectively disposed in the transmitter and receiver. The use of plural coders provide interleaving of the transmitted symbols and, accordingly, each decoder is operative upon every Mth symbol, where M is the number of encoders or decoders. If M is properly chosen, the probability of noise impairing the recovery of two successive symbols by any decoder is reduced. In addition, the error propagation effect inherent in decision feedback equalizers is distributed across different decoders.

As a result of the foregoing considerations, the combined benefits of decision feedback equalization and coding gain associated with the utilized error correction technique can be realized.

DETAILED DESCRIPTION

Figure 1:
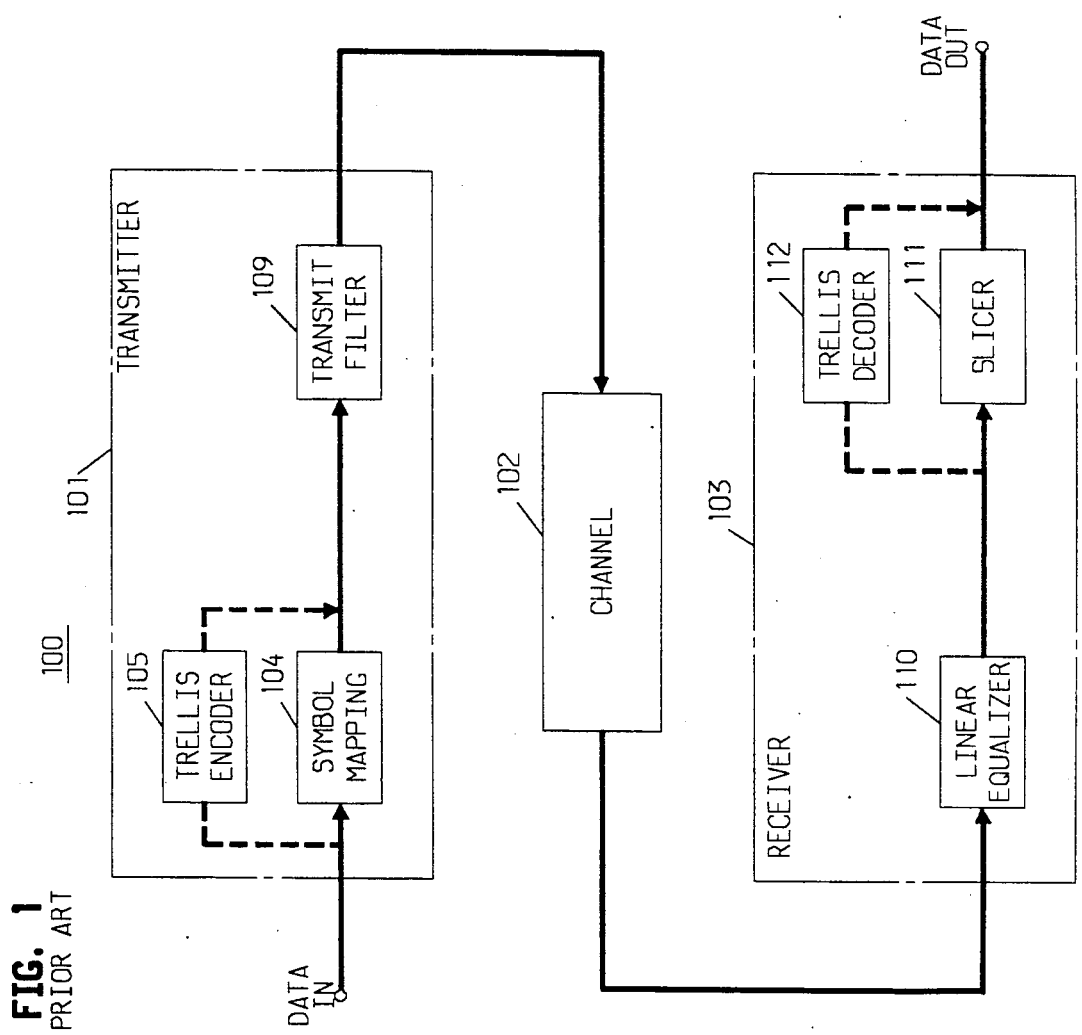
FIG. 1 is a prior art communications system incorporating a linear equalizer with or without error correction coding.

A prior art communication system 100 is shown in FIG. 1. Modem transmitter 101 generates a signal suited for transmission over a band-limited channel 102 which introduces various channel impairments, such as linear (amplitude and phase) distortion and additive noise. This corrupted signal is then processed by modem receiver 103 which tries to correct for the damaging effects introduced by the channel impairments.

In a prior art implementation of transmitter 101, for an uncoded modem, i.e., a modem not incorporating any error correction, the serial stream of binary data is directly fed to symbol mapping apparatus 104 which assigns discrete multilevel, typically multidimensional, symbols to successive blocks of bits according to some mapping rule. One such mapping rule, which is used for CCITT's V.32 standard for uncoded data transmission at 9.6 kb/s using quadrature-amplitude modulation (QAM), is defined by the 16-point signal constellation 301 shown in FIG. 3. Each signal point in a constellation has an associated bit code. For example, signal point 304 has the code 1111. In this example, four bits are mapped into one of 16 possible two-dimensional (or complex) symbols. These symbols are generated at a rate of 2400 symbols per second, which yields the desired bit rate of 9.6 kb/s, and are then passed through transmit filter 109 which provides the proper spectral shaping for transmission over band-limited telephone channel 102. A typical receiver for such an uncoded signal would simply consist of adaptive linear equalizer 110 and slicer 111 in receiver 103. Linear equalizer 110 compensates for the linear impairments in the channel, and slicer 111 decides which one of the 16 points of signal constellation 301 in FIG. 3 has been received in each symbol period. For example, if the output of equalizer 110 is complex point 303, then the slicer will choose the point in the signal constellation that is closest in Euclidean distance to point 303, which is point 304 in this illustrative example. After slicing, the receiver performs a symbol-to-bit mapping operation (not shown) which recovers a binary data stream of 9.6 kb/s from the received sliced symbols. It should, of course, be mentioned that a QAM signal requires modulation in the transmitter and demodulation in the receiver. These operations, which are well-known, have been omitted from the figures for purposes of simplicity.

In yet another prior art implementation of transmitter 101, for a coded modem, the incoming binary data stream is first passed through a trellis encoder 105 via the dotted line connections in lieu of to symbol mapping apparatus 104. For example, CCITT's V.32 standard for 9.6 kb/s data transmission has a coded option for which trellis encoder 105 consists of a convolutional encoder that generates an additional bit for each four incoming bits, and a symbol mapper that maps the resulting 5 bits into one of the 32 possible two-dimensional symbols defined by signal constellation 302 in FIG. 3. In this example, trellis encoder 105 uses the redundancy in the signal constellation to assure that only well-defined allowed sequences of symbols are transmitted. The receiver of a coded V.32 modem typically consists of linear adaptive equalizer 110 in receiver 103, whose output is fed to trellis decoder 112 via the dotted line connections instead of to slicer 111. Such a decoder implements a maximum-likelihood sequence estimation algorithm called the Viterbi algorithm. The decoded sequences are then fed to a symbol-to-bit mapper to restore the 9.6 kb/s bit stream. It has been shown theoretically and confirmed experimentally that, for trellis coded modems, a receiver incorporating linear adaptive equalizer 110 and trellis decoder 112 works well and provides increased immunity against additive noise generated in the channel.

The coded version of the V.32 modem can be used to achieve acceptable performance over the public switched telephone network for data rates up to about 14.4 kb/s, except that the number of points in signal constellation 302 has to be increased. Illustratively, a data rate of 14.4 kb/s can be achieved with a symbol rate of 2400 bauds and 6 bits of information per symbol. Since an additional bit is required for coding, a total of 128 two-dimensional points are required in the signal constellation. For data rates of 19.2 kb/s, and more, it is not feasible to just keep increasing the number of points in the signal constellation because the modem, even with coding, would become overly sensitive to the additive noise generated in the telephone channel. Instead, one can keep the number of points to a reasonable amount and increase the rate at which the symbols are sent through the channel. Unfortunately, an increase in symbol rate results in an increase of the bandwidth used by the transmitted analog signal which, in turn, results in a severe amplitude distortion of the signal at the lower and higher frequencies when it passes through the telephone channel. Linear equalizer 110, in FIG. 1, is notoriously bad at dealing with severe amplitude distortion because of the so-called noise enhancement problem. A linear equalizer essentially "inverts" the channel, that is, it introduces a large gain in the frequency regions where the channel introduces a severe loss. While such an action equalizes the channel and removes intersymbol interference, it also amplifies the noise, thus degrading the performance of the receiver. It has been determined that for data transmission at 19.2 kb/s, and more, over the public switched telephone network, it is not desirable to use a linear equalizer, and that a decision feedback equalizer (DFE) should be utilized instead. Such an equalizer introduces less noise enhancement but, unfortunately, cannot be used in conjunction with standard trellis coding, as will be explained hereinbelow.

Figure 2:
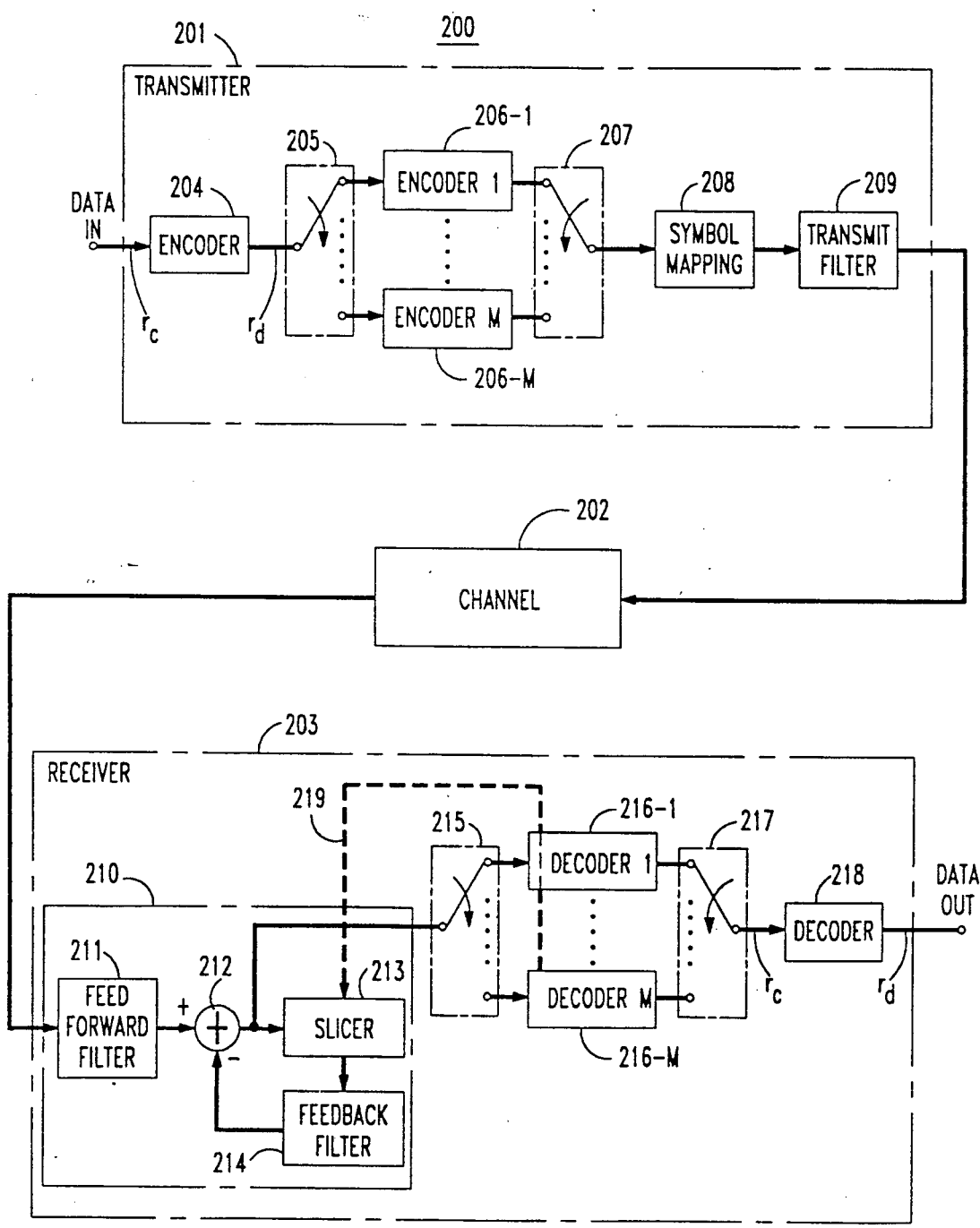
FIG. 2 is an embodiment of a communications system incorporating the present invention.

A communications system 200 incorporating the present invention is shown in FIG. 2. At transmitter 201 the incoming binary data stream with bit rate $r_d$ is first fed to error correction encoder 204, which encodes it onto another bit stream with, generally, a somewhat higher bit rate $r_c$. Illustratively, encoder 204 may implement a Reed-Solomon code or one of its well-known variations, such as interleaved Reed-Solomon codes. The bit stream at the output of encoder 204 is then passed through switch 205 which, in accordance with the invention, routes successive bits, or blocks of bits, to a plurality of M parallel encoders 206-$i$, where $i = 1, 2, \ldots, M$. This routing is conveniently done in a cyclic fashion in which case bit $b_n$ is fed to encoder 206-1, bit $b_{n+1}$ is fed to encoder 206-2, and so forth, and after M bits, bit $b_{n+M}$ is again fed to encoder 206-1 to start a new cycle. Alternatively, blocks of successive bits can also be fed in a cyclic fashion, i.e., in some ordered arrangement, to encoders 206-$i$. Illustratively, encoders 206-$i$ may each be a convolutional encoder of the type that is used in a standard trellis encoder. Switch 207 takes the outputs of encoders 206-$i$, preferably in a cyclic fashion, and feeds them to symbol mapping apparatus 208 which generates two-dimensional symbols of the type shown in FIG. 3 at a symbol rate $1/T$, where T is the symbol period. In the illustrative example where encoders 206-$i$ are convolutional encoders, the cascade of any of the encoders 206-$i$ with symbol mapper 208 can be thought of as being functionally equivalent to a trellis encoder. The cascade of the parallel arrangement of encoders 206-$i$ and symbol mapper 208 is then functionally equivalent to M parallel trellis encoders with each generating output symbols at a rate, $1/MT$, that is M times slower than the rate, $1/T$, at which symbols are transmitted over the telephone channel. Time-division multiplexing, or interleaving, of the outputs of the M trellis encoders then produces the desired symbol rate of $1/T$.

At receiver 203, the received signal is first equalized by DFE 210 whose detailed operation will be explained hereinbelow. The output samples of DFE 210 are rerouted by switch 215 to a parallel bank of M decoders 216-$i$, where $i = 1, 2, \ldots, M$. The rerouting, or deinterleaving operation performed by switch 215 has to be consistent with the interleaving operation performed by switch 207 at the transmitter. That is, if interleaving was done by taking the outputs of encoders 206-$i$ in a cyclic fashion, then switch 215 has to feed successive outputs from DFE 210 in a cyclic fashion to decoders 216-$i$. Illustratively, each decoder 216-$i$ may be implemented as a trellis decoder that generates decoded output symbols at a rate that is M times slower than the rate at which symbols are transmitted through the channel. Switch 217 takes the outputs of decoders 216-*i*, preferably in a cyclic fashion, and time multiplexes them onto a bit stream with bit rate $r_c$. This bit stream is then fed to decoder 218 which perfomrs error correction and produces an information bit stream with bit rate $r_d$.

It should be noted that in FIG. 2, the operation of the transmitter switches must be synchronized and the operation of the receiver switches must be synchronized. However, the operation of the transmitter switches need not be synchronized with those in the receiver.

In order to appreciate the improvement in performance provided by communications system 200, it is necessary to understand the shortcomings of an arrangement that tries to combine a DFE with standard trellis coding. The DFE 210 shown in FIG. 2 provides less noise enhancement than a linear equalizer because it subtracts out some of the intersymbol interference introduced by the channel's amplitude distortion rather than simply inverting the channel's amplitude characteristic. This is achieved by using adaptive feedforward filter 211, slicer 213, adaptive feedback filter 214, and subtractor 212. Slicer 213 operates in the same fashion as slicer 111 in FIG. 1 which was used to decode the symbols of an uncoded 9.6 kb/s modem. That is, in a given symbol period it selects the point in the signal constellation that is closest, in Euclidean distance, to the complex sample that is present at its input. When slicer 213 makes an error, by selecting the wrong symbol, this error will generally influence the slicing of subsequent samples generated by subtractor 212 and lead to more slicing errors, even though additive noise alone might not have generated these errors. This phenomenon, which is due to the feedback path provided by feedback filter 214, is inherent in the operation of the DFE and is called error propagation. The effect of error propagation is to introduce a strong, bursty, impulsive noise after subtractor 212.

Figure 4:
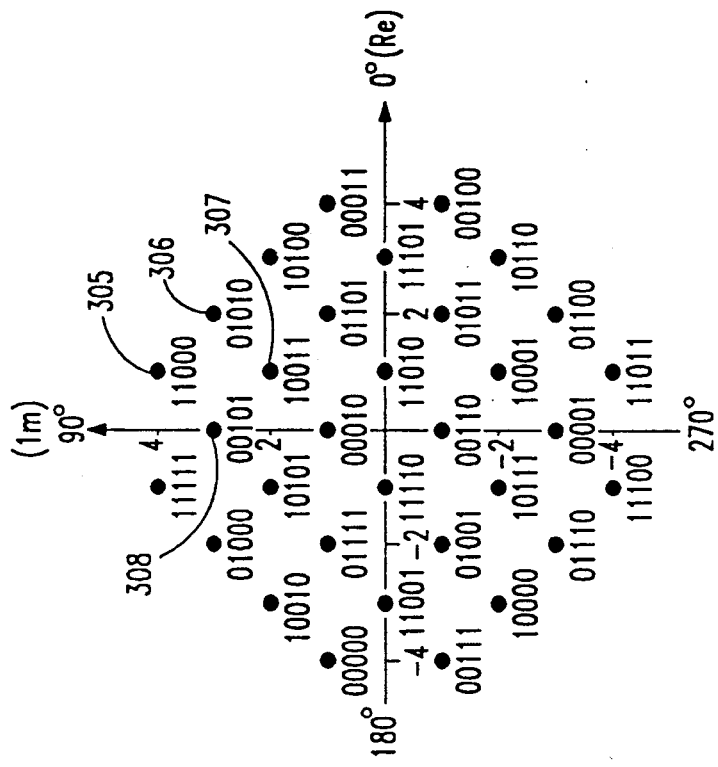
FIGS. 3 and 4 show illustrative signal constellations useful for understanding the present invention.
Figure 3:
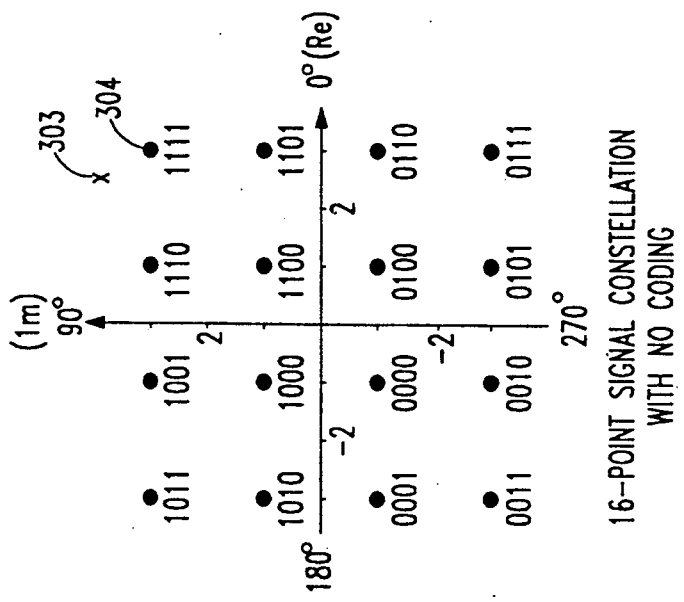

Notice, from FIGS. 3 and 4, that standard trellis coding requires an increase in the size of the signal constellation when compared to an uncoded system providing the same bit rate. In the case of FIGS. 3 and 4, a doubling of the number of points in the signal constellation was necessary when going from the uncoded option to the trellis-coded option. This increase in the number of points in the signal constellation results in a decrease in the distance between adjacent points. It should be apparent that if the outputs of linear equalizer 110 in FIG. 1 were passed through a slicer for both the coded and uncoded modes of operation, then the likelihood of making wrong decisions, because of additive noise, would be significantly larger for the coded system than the uncoded system. (In the illustrative example of the coded option of the V.32 modem, the outputs of linear equalizer 110 are first processed by trellis decoder 112 before slicing occurs, and the net result is an actual increase in robustness in the presence of noise.) Thus, if DFE 210 were used in receiver 103 rather than linear equalizer 110, then the likelihood of slicer 213 making an error would be significantly larger for the coded mode of operation than the uncoded mode of operation. In addition, as was mentioned hereinabove, each slicing error is also likely to induce subsequent slicing errors because of the error propagation effect. It has been found experimentally that the noisy bursts generated by a DFE can severely degrade the performance of a standard trellis decoder to a point where, for certain channels, an uncoded system using a DFE or a trellis-coded system using a linear equalizer will provide a better performance than a system using standard trellis coding and a DFE.

The improvement in performance provided by communications system 200, in accordance with the invention, is due to the concatenation of two corrective actions against the strong, bursty, impulsive noise that is generated at the output of subtractor 212 when error propagation occurs. The first action consists in separating this bursty noise into smaller disturbances that are easier to handle by a decoding device such as a trellis decoder. This is achieved through the use of encoders 206-*i* at the transmitter and decoders 216-*i* at the receiver, where i=1, 2, . . . , M. When a burst of noise occurs at the output of subtractor 212, successive samples of this noise are fed to different decoders 216-*i*. As a result, each of the decoders has to handle a smaller amount of noise and is more likely to correct for this noise than would be the case if one single decoder had to correct for the whole burst of noise. It has been found experimentally that a parallel arrangement of M trellis decoders (M>1), for example, always performs better than a system using only one trellis decoder (M=1). However, it has also been found that, for certain channels, one of the trellis decoders, say 216-1 for illustration purposes, may still have a noise sample at its input that is strong to interfere with the decoding process. In this case, the bit stream obtained after switch 217 consists of bursty blocks of bits, generated by decoder 216-1, which are likely to be in error and are interleaved with other blocks of bits, generated by the other decoders 216-*i*, i≠1, which are generally not in error. There are well-known coding schemes, such as the various variations of the Reed-Solomon codes, which are well suited to handle this type of bursty strings of errored bits. Encoder 204 at the transmitter and decoder 218 at the receiver implement such a coding scheme, and provide a second corrective action that further mitigates the damaging effects of the DFE's error propagation problem. It should be pointed out that the use of encoder 204 usually results in a slight increase of bandwidth for the analog data signal that is transmitted over channel 202. However, this increase in bandwidth can generally be kept small enough so that the resulting degradation in modem performance is far outweighed by the benefits that accrue from the usage of encoder 204 at the transmitter and its corresponding decoder 218 at the receiver.

There is a third technique that can further improve the performance of receiver 203 in FIG. 2. This technique can be used when the parallel arrangement of M convolutional encoders 206-*i* and symbol mapper 208 in transmitter 201 are M trellis encoders as explained hereinabove. In this case decoders 216-*i* in receiver 203 have to be implemented as a parallel bank of M trellis decoders. The technique consists of implementing a "smart" slicer whose decision-making process, in a given symbol period, is determined by information that is received from one of the decoders 216-*i*. For illustration purposes, it will be assumed that in the symbol period under consideration the output of subtractor 212 is coupled through switch 215 to the input of trellis decoder 216-1. In the next symbol period, the technique described hereinbelow would be repeated with decoder 216-2, and so forth. Before describing the technique, a brief discussion of the operation of a trellis encoder will be given with reference to the coded V.32 signal constellation 302 in FIG. 4.

When a trellis code is designed, the coded (redundant) signal constellation is partitioned into increasingly smaller subsets as explained, for example, in "Channel Coding With Multilevel/Phase Signals," G. Ungerboeck, *IEEE Transactions on Information Theory*, January 1982. For the purpose of this discussion, only the first partitioning needs to be considered. For signal constellation 302 this partitioning can, for example, divide the 32 points into two subsets A and B which have 16 points each, and the smallest distance between adjacent points in a subset is the same as the smallest distance between adjacent points in uncoded constellation 301. For example, if points 305 and 307 belong to subset A, then points 306 and 308 belong to subset B. In any given symbol period, only one of the two subsets, either A or B, can be used to select the symbol that has to be transmitted over the channel. The subset that has to be used is determined by the so-called state of the encoder during this symbol period. Transition from one state, in a given symbol period, to another state, in the next symbol period, it not arbitrary and is defined by the selected convolutional encoder. Going back now to receiver 203, assume that trellis decoder 216-1 has received a new input sample from subtractor 212 through switch 215. Trellis decoder 216-1 can monitor all the allowed sequences of state transitions and attach a likelihood metric to each sequence by processing a long-enough string of input samples. Thus, it can determine whether the new received sample is more likely to belong to either subset A or subset B. It can then feed this information to smart slicer 213 via dotted line 219 which then slices with respect to the reference points that are either in subset A or subset B depending on the information received from decoder 216-1. If the state information used by smart slicer 213 were always correct, then its performance (probability of making an error) would be equivalent to the performance of a more simplistic, or "dumb", slicer operating an uncoded signal constellation 301. In practice some degradation in performance is observed, but the smart slicer always outperforms the dumb slicer when operating on coded constellation 302. As is the case for most of the modem functions shown in FIG. 2, when the technique is used for voiceband modems, the smart slicer can conveniently be implemented as a subroutine in a program executed by a digital signal processor (DSP).

It should, of course, be noted that while the present invention has been described in terms of several illustrative embodiments, other arrangements will be apparent to those of ordinary skill in the art. For example, while the embodiments of the present invention have been described in reference to discrete functional elements, the function of one or more of these elements can be provided by one or more appropriately programmed general-purpose processors, or special-purpose integrated circuits, or digital signal processors, or an analog or hybrid counterpart of any of these devices. For example, while the present invention has been described in reference to particular two-dimensional signal constellations, the invention is also applicable to other two-dimensional signal constellations. Indeed, the present invention is applicable to signal constellations having other than two dimensions. Also, while a Reed-Solomon error correction code is implemented in encoder 204 and decoder 218, other types of codes may be used which correct bursts of error bits.

In addition, while in the disclosed embodiment, encoders 206-*i* and symbol mapping apparatus 208 operate as trellis encoders and decoders 206-*i* operate as trellis decoders, each encoder 206-*i* may operate independently of the symbol mapping apparatus so as not to constitutue a trellis encoder but, instead, a block or convolutional encoder. In such application, decoders 216-*i* would each operate as a block or convolutional decoder.

Finally, the present invention is not limited to voiceband applications but can be used in virtually any communication applications including high-definition televison systems.

We claim:

1. Receiver apparatus for use in a communications system comprising
   a decision feedback equalizer having an output;
   a plurality of first decoders connected to said decision feedback equalizer; and
   means for coupling data from said decision feedback equalizer output to said plurality of first decoders such that successive signals from said decision feedback equalizer output are coupled to a different first decoder in said plurality.

2. The receiver of claim 1 wherein each of said first decoders is a trellis decoder.

3. The receiver of claim 1 further including means for cyclically receiving the output of each first decoder in said plurality.

4. The receiver of claim 3 further including a second decoder which utilizes a coding scheme different from said first decoders, said second decoder being connected to the output of said cyclically receiving means.

5. The receiver of claim 4 wherein said second decoder employs Reed-Solomon decoding.

6. The receiver of claim 1 further including coupling means and wherein said decision feedback equalizer includes a slicer which makes decisions and utilizes information received from said plurality of first decoders via said coupling means to make such decisions.

7. The receiver of claim 1 wherein said communications system transmits symbols in an ordered sequence and said decision feedback is operative upon said symbols in said ordered sequence.

8. A method of recovering data in a communications system, said method comprising the steps of
   coupling said data to a decision feedback equalizer having an output; and
   coupling said data at said output to a plurality of decoders in a cyclic fashion such that successive data outputs of said decision feedback equalizer are coupled to a different decoder in said plurality of decoders.

9. The method of claim 8 further including said step of combining the outputs of each of said plurality of decoders to a second decoder utilizing a decoding process different from said plurality of decoders.

10. The method of claim 9 wherein said decoding process is Reed-Solomon decoding.

11. A transmitter for use in a communications system comprising
    a first encoder for coding data symbols using a first coding scheme, said first encoder forming a sequence of data symbols in a predetermined time order;
    a plurality of second encoders for further coding the data symbols outputted by said first encoder using a second coding scheme different from said first coding scheme;

means for coupling the outputs of said first encoder to said plurality of second encoders such that successive outputs of said first encoder are coupled to a different second encoder in said plurality; and means for coupling the outputs of said plurality of second encoders in a cyclic fashion to a transmission channel in a manner which restores said predetermined time order.

12. The transmitter of claim 11 wherein said first encoder utilizes Reed-Solomon coding.

13. The transmitter of claim 11 wherein each of said plurality of second encoders is a trellis coder.

14. A communications system comprising a transmitter comprising
a plurality of coders;
means for coupling symbols to be transmitted from said plurality of coders in a cyclic fashion so that successive ones of said symbols are coupled from different ones of said coders; and
a receiver comprising
a decision feedback equalizer;
a plurality of decoders connected to said decision feedback equalizer; and
means for coupling data from said decision feedback equalizer output to said plurality of decoders such that successive data from said decision feedback equalizer output are coupled to a different decoder in said plurality.

* * * * *